(12) United States Patent
Perlin

(10) Patent No.: US 6,351,335 B1
(45) Date of Patent: Feb. 26, 2002

(54) EXTREMELY HIGH RESOLUTION FOVEATED DISPLAY

(75) Inventor: Kenneth Perlin, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 09/543,959

(22) Filed: Apr. 7, 2000

Related U.S. Application Data

(60) Provisional application No. 60/128,765, filed on Apr. 8, 1999.

(51) Int. Cl.[7] .............................. G02B 27/10; G09G 5/00

(52) U.S. Cl. ............................ 359/618; 359/626; 345/1

(58) Field of Search ................................. 359/618, 619, 359/626; 345/1, 98, 127

(56) References Cited

U.S. PATENT DOCUMENTS 6,195,068 B1 * 2/2001 Suzuki et al. ................... 345/1
6,208,467 B1 * 3/2001 Naka et al. .................. 359/618
6,252,989 B1 * 7/2001 Geisler ........................ 382/232

OTHER PUBLICATIONS

Bederson, Benjamin B., "A Miniature Space–Variant Active Vision System: Cortex–I", Jun. 1992.
Kortum, Philip, Geisler, Wilson, "Implementation of a foveated image coding system for image bandwidth reduction", *SPIE Proceedings*, 2657, 350–360, 1996.
Velichkovsky, Boris M., "Communicating attention—Gaze position transfer in cooperative problem solving", *Pragmatics & Cognition*, vol. 3(2), 1995, pp. 199–224.
Curcio, Christine A., Sloan, Jr., Kenneth R., Packer, Orin, Hendrickson, Anita E., Kalina, Robert E., "Distribution of Cones in Human and Monkey Retina: Individual Variability and Radial Asymmetry", *Science*, May 1, 1987, vol. 236, pp. 497–644.
Wodnicki, Robert, Roberts, Gordon W., Levine, Martin D., "A Foveated Image Sensor in Standard CMOS Technology", Presented at the Custom Integrated Circuits Conference, Santa Clara, May 3, 1995.

(List continued on next page.)

*Primary Examiner*—Georgia Epps
*Assistant Examiner*—Saeed Seyrafi
(74) *Attorney, Agent, or Firm*—Ansel M. Schwartz

(57) ABSTRACT

A foveated display. The display includes a computer. The display includes a detailed imaging element for imaging a detailed portion of an image from the computer. The imaging element is connected to the computer. The display includes a focusing mechanism for focusing the detailed portion of the image. The focusing mechanism is disposed adjacent to the imaging element and connected to the computer. The display includes a wide area imaging element for imaging a wide-area portion of the image. The wide area imaging element is connected to the computer. The display includes means to optically combine the detailed portion with the wide area portion to form a foveated image. The display includes an imaging lens which focuses the foveated image to a desired location wherein the detailed imaging element, the focusing mechanism and the wide area imaging element have no moving parts. A method for producing a foveated image. The method includes the steps of producing a detailed portion of the image with a detailed imaging element from a computer connected to the detailed imaging element. Then there is the step of producing a wide area portion of the image with a wide area imaging element from the computer connected to the wide area imaging element. Next there is the step of combining the detailed portion with the wide area portion to form the foveated image. Then there is the step of focusing the foveated image onto a desired location.

21 Claims, 3 Drawing Sheets

OTHER PUBLICATIONS

Chang, Ee-Chien, Yap, Chee K., "A Wavelet Approach to Foveating Images", Jan. 10, 1997.

Stiefelhagen, Rainer, Yang, Jie, Waibel, Alex, "Tracking Eyes and Monitoring Eye Gaze". No Date Available.

Baluja, Shumeet, Pomerleau, Dean, "Non-Intrusive Gaze Tracking Using Artificial Neural Networks", Jan. 5, 1994.

Pardo, F., Boluda, J.A., Perez, J.J., Dierickx, B., Scheffer, D., "Design issues on CMOS space-variant image sensors", *SPIE Conference on Advanced Focal Plane Arrays and Electronic Cameras' AFPAEC'96,* Berlin, Oct. 96.

Jacob, Robert J. K., "Eye Tracking in Advanced Interface Design", Human-Computer Interaction Lab, Naval Research Laboratory, Washington, D.C. Not Date Available.

* cited by examiner

EXTREMELY HIGH RESOLUTION FOVEATED DISPLAY

This application claims the benefit of U.S. Provisional Application No. 60/128,765 filing date Apr. 8, 1999.

FIELD OF THE INVENTION

The present invention is related to a foveated display. More specifically, the present invention is related to a foveated display where a detailed imaging element, a focusing mechanism and a wide area imaging element have no moving parts.

BACKGROUND OF THE INVENTION

Digital displays generally have much coarser resolution than the human eye is capable of resolving. The human eye has a central "foveal" region in which up to 60 linear dots can be resolved in one angular degree (ie: the human foveal region has an acuity of 60 dots per linear degree). This is surrounded by a region known as the macula, which has somewhat less acuity, that extends to about four angular degrees. Surrounding the macula, the retina consists of a wide region having relatively low acuity, extending approximately 170 angular degrees for each eye (C., Curcio, K. Sloan, O. Packer, A. Hendrickson, R. Kalina, (1987) "Distribution of cones in human and monkey retina: individual variability and radial asymmetry." Science 236, 579–582), incorporated by reference herein.

The human eyeball is capable of rotating rapidly about its center, and thereby rapidly repositioning its fovea, at an angular velocity of approximately 700 degrees per second. Such rapid movements are called saccades. The brain integrates over time the information entering the small but very agile high resolution-density foveal region, to create the subjective impression of a uniform-density very wide angle and high resolution display. To the human observer, the subjective impression is that our eyes can perceive 60 linear dots for every angular degree, or about 60×170=102,000 linear dots across the eye's entire field of vision. Over the area visible to the eye from a fixed head position, this is equivalent to a digital display having on the order of 100,000,000,000 pixels.

In order for a static display to fully exploit the acuity of human vision, it would be necessary to combine tens of thousands of conventional displays into a giant mosaic. This would be very expensive and unwieldy.

A number of researchers have created displays for which resolution varies over the display surface, to better take advantage of the human eye's foveal architecture. Such foveated displays contain a higher resolution in their center than near their periphery. If the user looks directly at the center of such a display, he can receive more information per display pixel than is the case for uniform density displays. The earliest foveal displays required the eye gaze to be fixed in a single direction in which the resolution was highest, for an extended period of time. This is useful for experimental measurements of human visual acuity, but is not practical for most uses, as humans find it very uncomfortable to maintain a fixed gaze direction for a long period of time.

Levoy et al., incorporated by reference herein, has tracked a user's head position, using a rotating mirror to actively reposition a small high resolution-density display, within a fixed larger display, to accommodate the high acuity in the foveal region. The larger display was used to cover a large part of the visual field at relatively low acuity. This device followed the user as he rotated his head, but it required the user to gaze straight ahead, since the high density region corresponded to the direction the user's head was facing, not to his gaze direction.

A number of researchers have developed effective technologies to continually track human gaze (S. Baluja, D. Pomerleau, "Non-intrusive gaze-tracking using artificial neural networks." Neural information processing systems 6, Morgan Kaufman Publishers, New York, 1994), (J. Hansen, A Andersen, P. Roed, "Eye-gaze control of multimedia systems." In Y. Anzai, K. Ogawa and H. Mori (eds), Symbiosis of human and artifact. Proceedings of the 6th international conference on human computer interaction. Elsevier Science Publisher, Amsterdam, 1995), (R. Jacob, "Eye tracking in advanced interface design." In W. Barfield and T. Furness (eds.), Advanced interface design and virtual environments. Oxford University Press, Oxford, 1995), (R. Stiefelhagen, J. Yang, A. Waibel, "Tracking Eyes and Monitoring Eye Gaze," Workshop on Perceptual User Interfaces, Banff, Canada, 1997), all of which are incorporated by reference herein. Tracked gaze direction has long been used to vary spatially across a displayed image between low and moderate resolution (U.S. Pat. No. 4,348,186—Pilot helmet mounted CIG display with eye coupled area of interest), incorporated by reference herein, where moderate resolution is defined to be the highest resolution that can be effected in a single raster display device (e.g.: 1600×1200 pixels). At normal viewing distances, such resolutions perform very poorly in comparison with the acuity of which the human visual system is capable.

Gaze direction information from a tracking device could be used to present a person with a very high resolution image in the foveal region, by constructing a display apparatus which continually repositions a high resolution-density image, depending on the direction of the observer's gaze. This is a much more difficult engineering task to achieve with speed, accuracy and low cost than is head-orientation tracking, as gaze saccades are considerably more rapid than are changes in head direction.

One method of positioning a high resolution-density image so as to match a rapidly changing foveal region is to mechanically rotate a set of mirrors lying in a single optical path that contains a large surrounding lower resolution image which has been optically combined with a small higher resolution image. The combined image is projected through a common optical system, into the direction in which a gaze-tracked observer is gazing (U.S. Pat. No. 4,634,384: Head and/or eye tracked optically blended display system), incorporated by reference herein.

Another related method, more suitable for a head-mounted display, is to use a half-silvered mirror and retroreflective material, so as to position a rotating mirror to be coincident with the center of the observer's eyeball in the optical path (B. Bederson, R. Wallace, E. Schwartz, "A miniature pan-tilt actuator: the spherical pointing motor," IEEE Transactions Robotics and Automation, vol. 10, pp. 298–308, 1994), incorporated by reference herein. A foveated display is positioned in front of this mirror. Changes in the direction of the observer's gaze by angle θ about any axis are mimicked by rotating the mirror by angle θ/2, thereby attempting to maintain optical alignment between the observer's gaze and the high-resolution center of the foveated display.

The major shortcoming of this approach is the need for a mechanically moving mirror, which, being mechanical, is subject to all of the attendant problems of accuracy, vibration, calibration, drift, and unwanted resonance.

Similarly, foveated camera sensors have been described by (P. Kortum, W. Geisler, "Implementation of a foveated image-coding system for bandwidth reduction of video images," SPIE Proceedings: Human Vision and Electronic Imaging, vol. 2657, pp. 350–360, 1996), (F. Pardo, J. A. Boluda, J. J Perez, B. Dierickx, D. Scheffer, "Design issues on CMOS space-variant image sensors," Proc. SPIE, Advanced Focal Plane Processing and Electronic Cameras, Vol. 2950,pp. 98–107, 1996), (J. van der Spiegel, G. Kreider, C. Claeys, I. Debusschere, G. Sandini, P. Dario, F. Fantini, P. Belluti, G. Soncini, "A foveated retina-like sensor using CCD technology,". In C. Mead & M. Ismail, editor, Analog VLSI implementation of neural systems, chapter 8, pp. 189–212. Kluwer Academic Publishers, Boston, 1989. Proceedings of a workshop on Analog Integrated Neural Systems), (R. Wodnicki, G. W. Roberts & M. D. Levine, "A foveated image sensor in standard CMOS technology," Proc. Custom Integrated Circuits Conf., pp. 357–360, 1995), all of which are incorporated by reference herein, and others. These sensors have radially varying spatial acuity, generally attempting to emulate the human visual system's logarithmic drop-off of acuity with radial distance from its foveal region. In the current art, such sensors can vary their location of highest acuity only by moving either a set of mirrors, or else by mechanically rotating the sensor chip itself, along with its associated optics.

As is the case with foveated image projection, this approach is subject to all of the attendant problems of accuracy, vibration, calibration, drift, and unwanted resonance that result from the requirement for rapidly moving mechanical components.

SUMMARY OF THE INVENTION

The present invention pertains to a foveated display. The display comprises a computer. The display comprises a detailed imaging element for imaging a detailed portion of an image from the computer. The imaging element is connected to the computer. The display comprises a focusing mechanism for focusing the detailed portion of the image. The focusing mechanism is disposed adjacent to the imaging element and connected to the computer. The display comprises a wide area imaging element for imaging a wide-area portion of the image. The wide area imaging element is connected to the computer. The display comprises means to optically combine the detailed portion with the wide area portion to form a foveated image. The display comprises an imaging lens which focuses the foveated image to a desired location wherein the detailed imaging element, the focusing mechanism and the wide area imaging element have no moving parts.

The present invention pertains to a method for producing a foveated image. The method comprises the steps of producing a detailed portion of the image with a detailed imaging element from a computer connected to the detailed imaging element. Then there is the step of producing a wide area portion of the image with a wide area imaging element from the computer connected to the wide area imaging element. Next there is the step of combining the detailed portion with the wide area portion to form the foveated image. Then there is the step of focusing the foveated image onto a desired location.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
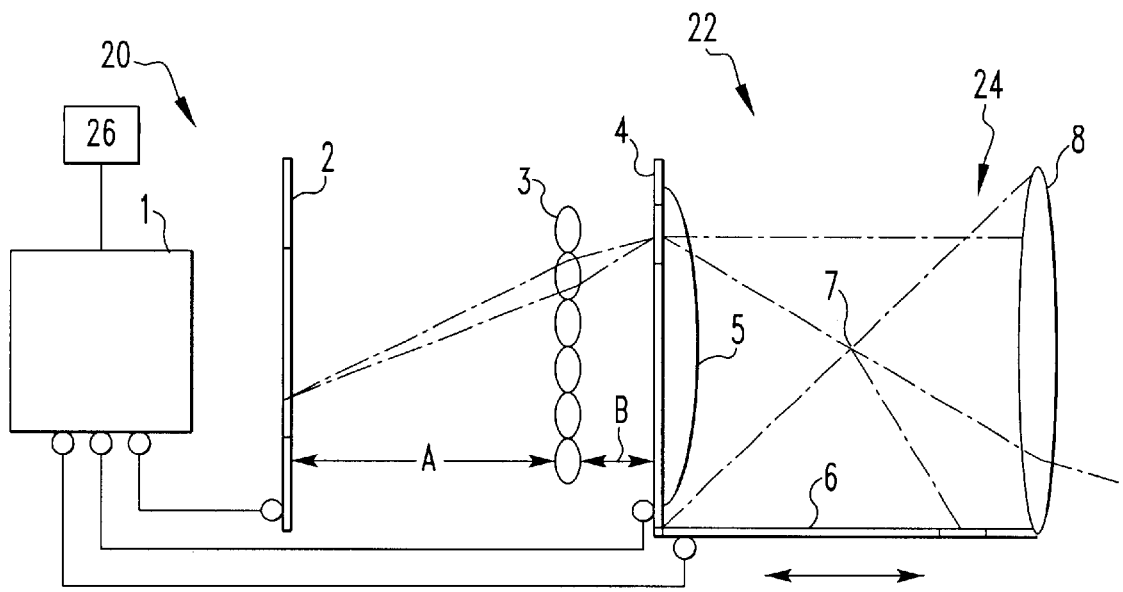
FIG. 1 is a schematic representation of a foveated display of the present invention.

Referring now to the drawings wherein like reference numerals refer to similar or identical parts throughout the several views, and more specifically to FIG. 1 thereof, there is shown a foveated display 20. The display 20 comprises a computer 1. The display 20 comprises a detailed imaging element 2 for imaging a detailed portion of an image from the computer 1. The detailed imaging element 2 is connected to the computer 1. The display 20 comprises a focusing mechanism for focusing the detailed portion of the image. The focusing mechanism is disposed adjacent to the imaging element and connected to the computer 1. The display 20 comprises a wide area imaging element 6 for imaging a wide-area portion of the image. The wide area imaging element 6 is connected to the computer 1. The display 20 comprises means 22 to optically combine the detailed portion with the wide area portion to form a foveated image. The display 20 comprises an imaging lens 8 which focuses the foveated image to a desired location wherein the detailed imaging element 2, the focusing mechanism and the wide area imaging element 6 have no moving parts.

Preferably, the focusing mechanism includes an active mask 4 connected to the computer 1. The focusing mechanism preferably includes focusing elements 3 disposed between the detailed imaging element 2 and the active mask 4 for focusing the detailed portion of the active mask 4. The focusing elements 3 preferably include an m×n array of focusing elements 3.

Preferably, the focusing mechanism includes a condensing lens 5 for redirecting the detailed portion from the active mask 4 to the combining means 22. The combining means 22 preferably includes a beam splitter 24 disposed between the active mask 4 and the wide area imaging element 6. The beam splitter 24 is preferably a half-silvered mirror 7. Preferably, the beam splitter 24 is disposed at an intermediate angle between the active mask 4 and the wide area imaging element 6. Preferably, the beam splitter 24 is disposed at a 45 degree angle between the active mask 4 and the wide area imaging element 6. The display 20 preferably includes a pointing device 26 which identifies where the detailed portion is disposed in the wide area portion.

Preferably, the detailed portion follows an optical axis and a distance A along the optical axis between the detailed imaging element 2 and the array of forming elements is n/k times a distance B between the array of focusing elements 3 and the active mask 4, where k is a positive integer. Preferably, K=2. Preferably, each focusing element has a focal length f such that $1/f = 1/A + 1/B$.

The present invention pertains to a method for producing a foveated image. The method comprises the steps of producing a detailed portion of the image with a detailed imaging element 2 from a computer 1 connected to the detailed imaging element 2. Then there is the step of producing a wide area portion of the image with a wide area imaging element 6 from the computer 1 connected to the wide area imaging element 6. Next there is the step of combining the detailed portion with the wide area portion to form the foveated image. Then there is the step of focusing the foveated image onto a desired location.

Preferably, the combining step includes the step of focusing the detailed image and the wide area image onto a beam splitter 24. The producing the wide area image step preferably includes the steps of retrieving the wide area image from the computer 1, and multiplying it by a dark spot image computed by the computer 1. Preferably, before the multiplying step, there is the step of calculating the dark spot to be centered on a foveated region of the foveated display 20. The calculating step preferably includes the step of calculating the dark spot to have a size which makes a gradual spatial transition between the detailed portion and the wide area portion.

Preferably, the producing the detailed portion step includes the step of obtaining the detailed portion from the computer 1 that consists of a rectangular array of active pixels in a torodial topology. Before the combining step there is preferably the step of projecting the detailed image through an active mask 4 which blocks the transmission of light everywhere except at a selectively transparent spot surrounding the foveated region. Preferably, the projecting step includes the step of positioning the transparent spot so as to be optically coincident with the dark spot image.

In the operation of the invention, the apparatus describes a new form of extremely high resolution foveated display 20 in which the high density region can at any moment in time be repositioned to an arbitrary location, with great precision, independently of where it was positioned during the previous moment in time. The apparatus contains no mechanically moving parts. In addition, the same mechanism can be used, with minor variations, to enable an extremely high resolution foveal-region camera that contains no mechanically moving parts, which can be used to examine a scene such that a small portion may be examined at very high resolution. The high-resolution region to be captured at any image-capture frame may be repositioned to an arbitrary location, with great precision, independently of where it was positioned at earlier moments in time. The image can be stored in a memory connected to the display 20.

The apparatus comprises a computer with CPU and memory (1), a imaging element for the detail portion of the image, such as a TFT LCD in the case of a projector or a CCD array in the case of a camera (2), an array of small focusing elements, such as lenses, pinholes, or Holographic Optical Elements (3), a high contrast imaging element to act as an active mask, such as a transmissive TFT LCD (4), a condensing lens (5), an imaging element for the wide-area portion of the image, such as a TFT LCD in the case of a projector or a CCD array in the case of a camera (6), a means to optically combine the detail region with the wide-area image, such as a half-silvered mirror placed at 45 degree angle (7), and an imaging lens (8).

As shown in FIG. 1, the computer (1) communicates with the detail-level imaging element (2), the active mask (4), and the wide-area imaging element (6).

The array of focusing elements (3) can in one embodiment consist of a square of n×n focusing elements. The position along the optical axis of the plane containing the focusing elements (3) with respect to the imaging element (2), and of the plane (4) on which the focusing elements refocus this image, is such that the distance A along the optical axis from (2) to (3) is n/k times the distance B along the optical axis from (3) to (4), where in one embodiment k=2. The focal length f of each small focusing element is set such that $1/A+1/B=1/f$. This guarantees that an image on (2) will remain in focus as a tiling array of small images on (4), and that each of these images is linearly reduced in size on (4) by a factor of n/k, as compared with the corresponding image on (2).

Sequence of Operation for the User

The user sees a wide area, which has retrieved from the computer (1), where it has either been stored in memory, or else synthesized algorithmically, or else some combination thereof, for example by employing currently known computer graphics techniques (Computer Graphics (proceedings of ACM SIGGRAPH Conference), Vols. 1–31), incorporated by reference herein. Some input method is used to indicate a center of a foveal region for the display 20. The user can supply a foveal center location by many well-known methods, including moving a mouse or other pointing device. Alternatively, the user can supply a foveal center location by moving his eye gaze position. In the latter method, a mechanism such as one of those now practiced in the art, such as a computer-tracked video image or retroflective spot, is used to determine the user's current eye gaze position.

Figure 2:
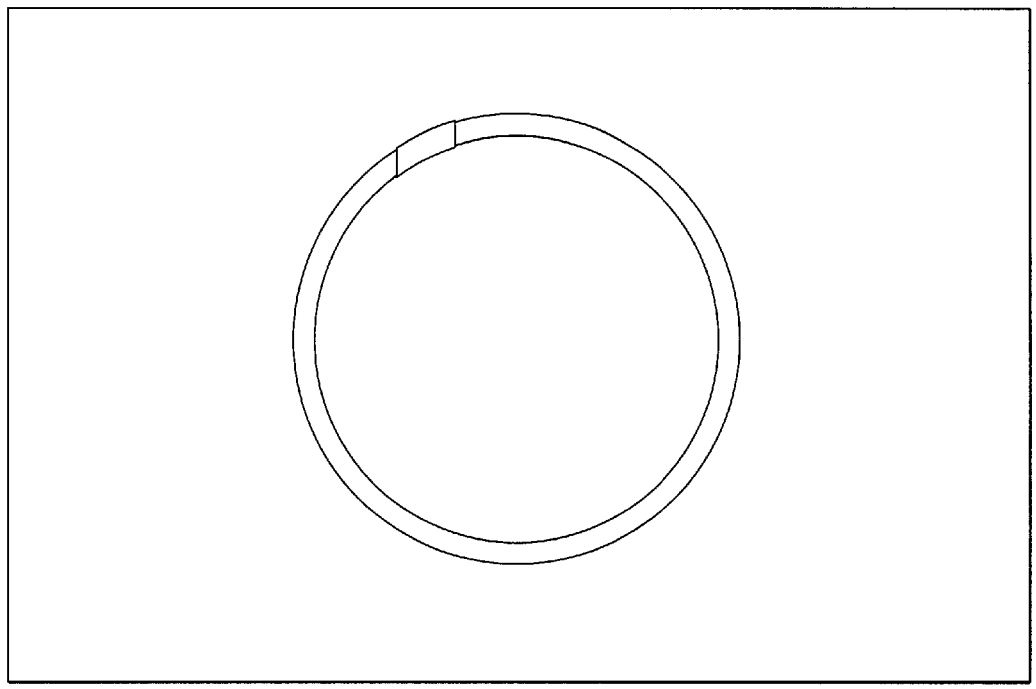
FIG. 2 shows a detailed portion of an image.

The entire display 20 presents an image with a moderate resolution, such as can be attained by use of a single active-pixel imaging element. In one embodiment, this resolution is 1600×1200 pixels. Simultaneously, the region centered on whatever location the user has indicated is displayed at n times this resolution, where in one embodiment n=25. When the user indicates a different location for high resolution display, then the center of the higher resolution portion of the display 20 immediately shifts to the new location, as shown in FIG. 2.

Internal Sequence of Operation

A foveal projection is created as an optical combination of two component images. To form the first of these components, the entire wide-angle is retrieved from the computer (1), then multiplied by a computed image of a dark spot, and finally displayed on the wide-angle display element (6). This image is reflected off the 45 degree mirror (7), and projected through the lens (8) onto a view surface, or else focused into an observer's eye for direct viewing. The total optical contribution of the wide-angle view is a moderate resolution (e.g.: 1600×1200) image formed on a TFT LCD.

Figure 3:
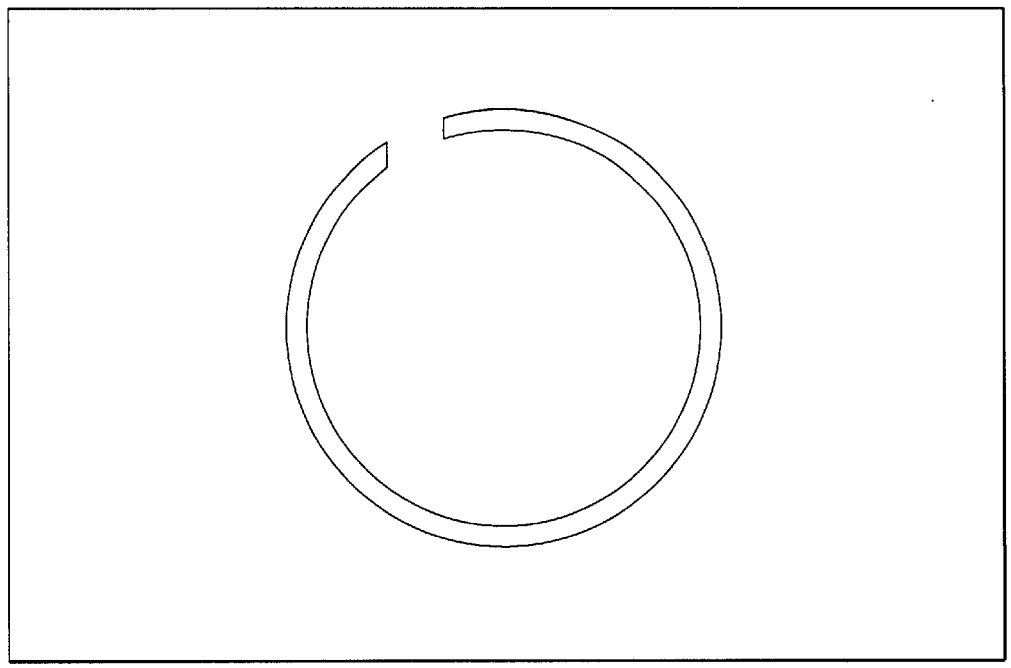
FIG. 3 shows a dark spot centered on the foveal region.

The dark spot is calculated to be centered on the foveal region, as shown in FIG. 3. This spot has a size calculated to make a gradual spatial transition between the high and low density regions. For example, if the foveal region is centered at location x,y in the wide-angle view, and takes up the same space as m×m pixels of wide-angle the wide angle image (where in one embodiment m=64), then the pixel values of the wide-angle image are multiplied by a darkening function which in one embodiment is: $(1-S(2x/m-1) * S(2y/m-1))$, where S(t) is a smoothly varying kernel function that transitions smoothly from 1 when $|t|$ is significantly less than 1, to 0 as $|t|$ increases toward 1. One example of such a function is:

ti $S(t)=$ if $|t|<0.5$ then 0 else if $|t|>1$ then 1 else transition $(2|t|-1)$ where $$transition(x) = 3x^2 - 2x^3$$

The wide-angle view is optically added to a second component, a detailed view which has been retrieved from the computer (1). This detailed view is first formed on imaging element (2), which consists of a rectangular array of (P+2p)×(P+2p) active pixels. The image formed on (2) has a toroidal "wrap-around" topology. Conceptually, the imaging element contains a multiple tiling of a continuous P×P torus, in which row P−1 is considered to be just prior to row 0, and column P−1 is considered to be just prior to column 0. All locations (x1, y1) and (x2, y2) for which ($x1_{mod\ P}$=$x2_{mod\ P}$) and ($y1_{mod\ P}$=$y2_{mod\ P}$) are set to the same pixel values.

The pixels in columns 0 to P−1 and in columns P+p to P+2p−1 constitute a horizontal overscan region, and the pixels in rows 0 to P−1 and in rows P+p to P+2p−1 constitute a vertical overscan region.

Figure 4:
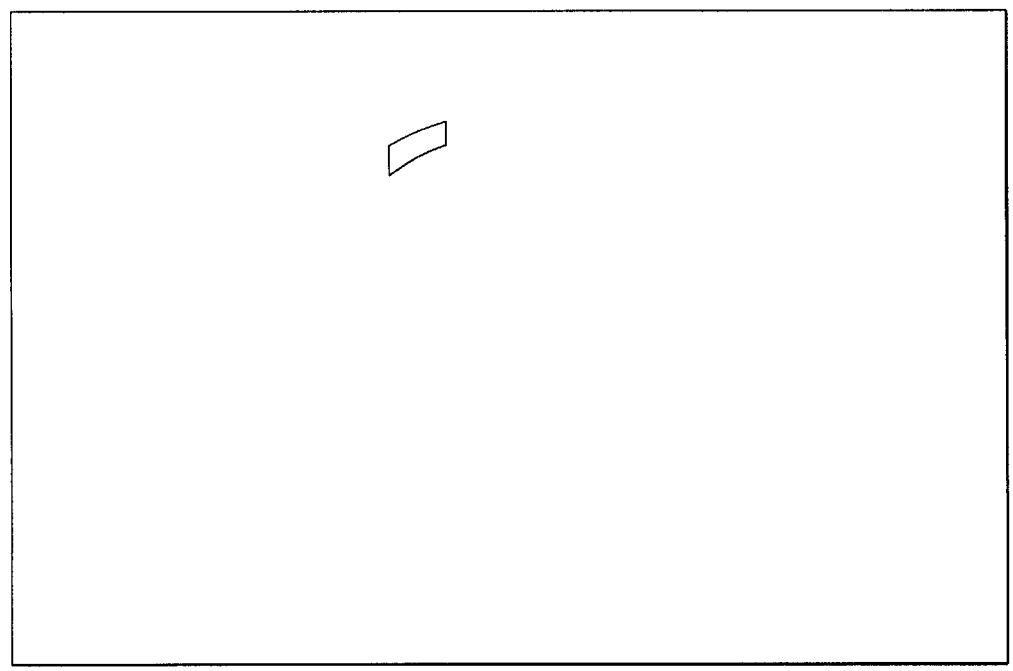
FIG. 4 shows a mosaic image after it has been selectively masked.
Figure 5:
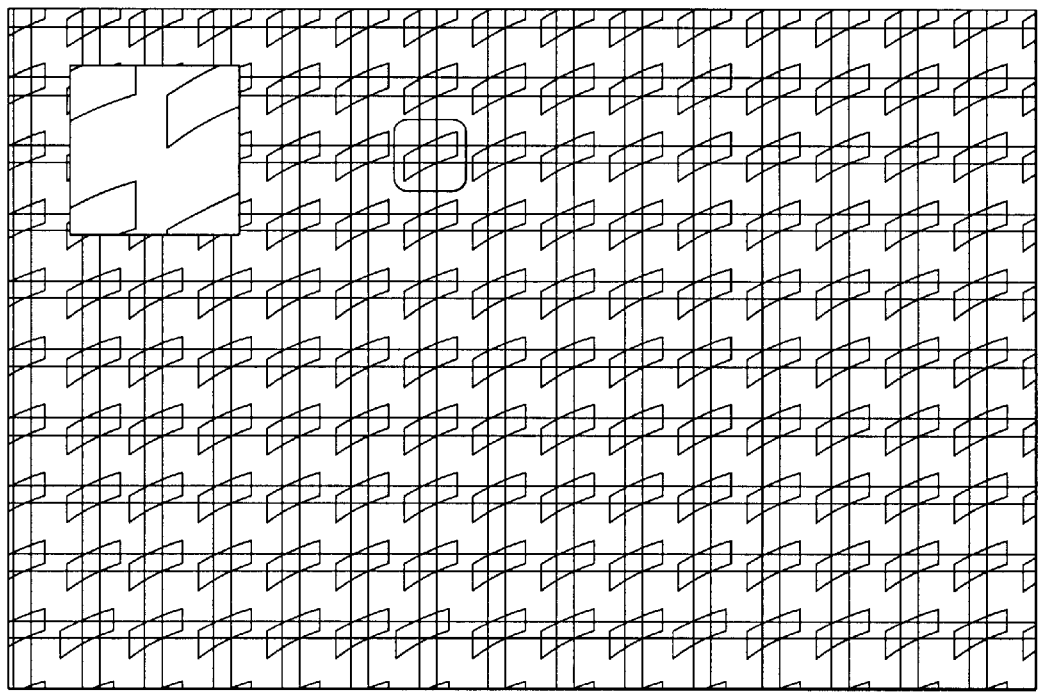
FIG. 5 shows the mosaic image before masking in regard to FIG. 4.
Figure 6:
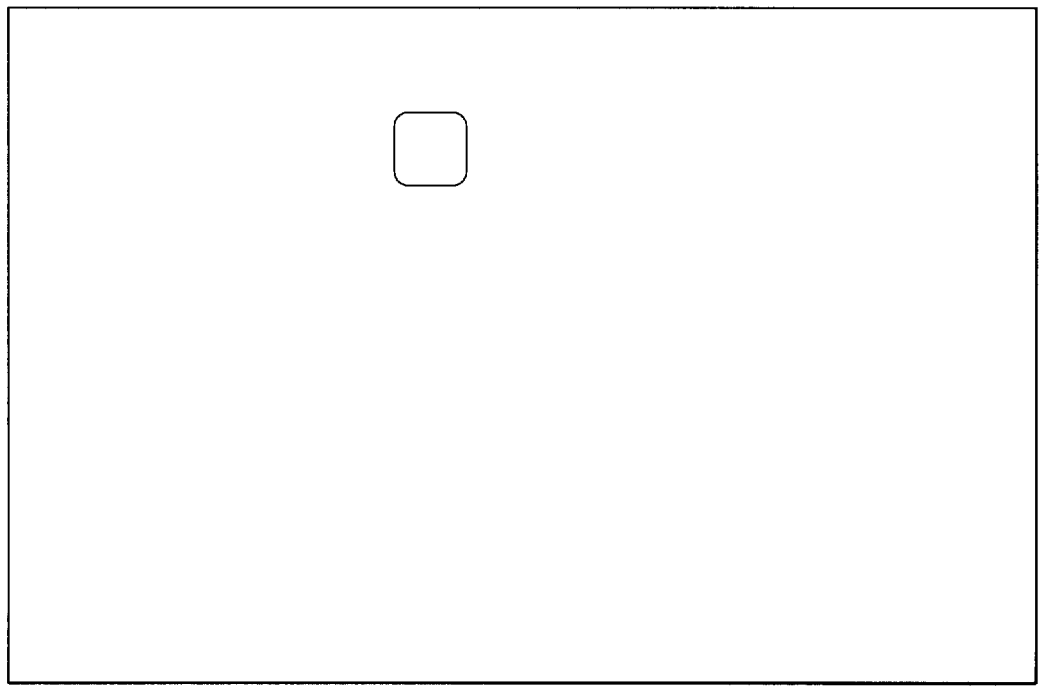
FIG. 6 shows a masking pattern in regard to FIG. 5.

The image formed on imaging element (2) is projected as a mosaic of identical tiled images, by being projected through an array of focusing elements (3), and focused onto a planar region in space which is coincident with a second (masking) TFT LCD (4). This masking TFT LCD is used to block transmitted light everywhere except in a selectively transparent spot surrounding the foveal region. The result of the mosaic image after it has been selectively masked is shown in FIG. 4. The result of the mosaic image before masking is shown in FIG. 5. The masking pattern itself, as it is formed on the masking TFT LCD (4) is shown in FIG. 6.

The transparent spot of the mask is positioned so as to be optically coincident with the selectively darkened spot on display (6), as superimposed by the half-silvered mirror (7). In particular, the active elements of masking TFT LCD (4) are used to block transmitted light according to the function ( S(2x/m−1) * S(2y/m−1) ), where x and y correspond to the optically coincident x and y on display (6), as superimposed by the half-silvered mirror (7).

The image from (2) is projected by the array of focusing elements (3) such that a tile pattern is formed on focal plane (4), as shown in FIG. 5. The width of each tile at focal plane (4) corresponds to P pixels of width on imaging element (2), and the height of each tile at focal plane (4) corresponds to P pixels of height on imaging element (2).

It would be extremely difficult to exactly align the edges of the individual tiled images projected by lens array (3) onto plane (4) from imaging element (2) so as to avoid small gaps or overlaps. For this reason, the pixels in the horizontal overscan region of imaging element (2) are used to cross-dissolve between the leftmost pixels of the imaging element displayed through the lenses in each column of the lens array and the rightmost pixels of the imaging element displayed through the lenses in the next column to the left. Similarly, the pixels in the vertical overscan region of imaging element (2) are used to do a cross-dissolve between the topmost pixels of the imaging element displayed through the lenses in each row of the lens array and the bottommost pixels of the imaging element displayed through the lenses in the next row above. This transition function is precalibrated to ensure even density of the spatial dissolve across the edge shared by each pair of adjoining tiles. These precalibrated values are stored in a table, which is used to modulate a transition function such as $3t^2-2t^3$, where t is the fraction along the overlap. By doing this, adjoining tiles are seamlessly blended together, without the transition from one tile to another resulting in systematic gaps or variations in brightness.

FIG. 5 shows not only the mosaic image before selective masking, but also a set of grid lines. These grid lines are not actually part of the image formed. They are shown here to delineate the areas of overlap between adjoining tiles. Also, FIG. 5 contains an inset image, enlarged by a factor of two, near its top left corner. This detail image shows the source tile image as processed by the computer (1) to be formed on the detail-producing imaging-element (2). Note that this image contains significantly more than a single tile. In fact, some portions of the tile are represented four times, once near each of the four corners of the tile. These are overscan areas. Before this image is actually displayed on the imaging-element (2), the computer (1) calculates a selective darkening within these overscan areas, as described above, so that when projected onto the mosaic focal plane (4) the result will be a single tiled image with uniformly compensated brightness everywhere.

The condensing lens (5) redirects the light from the imaging element (2) to the view lens (8) in the case of a projector, and from the view lens to the imaging element in the case of a camera. The condensing lens can be place in any portion of the optical path between the imaging element and the view lens. In FIG. 1 it is shown placed between the active mask (4) and the view lens (8). Alternatively it can be placed between the imaging element and the microlens array (3) or between the microlens array and the active mask.

Spatially Variable Resolution on the Imaging Chip

In order to make optimal use of available bandwidth, the imaging element (2) can be driven to output spatially variable resolution, with the highest resolution located at the foveal location of the tile. Foveation-based compression of a single image has been used by (E. Chang, C. Yap, "A wavelet approach to foveating images", ACM Symposium on Computational Geometry, Vol 13, 1997), incorporated by reference herein, and others to reduce transmission bandwidth. The current invention takes particular advantage of this compression technique, allowing the large bandwidth savings afforded by foveation-based compression, while maintaining the extremely high effective resolution that the eye is capable of perceiving.

At any given moment, this foveal region can be located anywhere on the chip, but there is always one foveal location, away from which effective resolution can be allowed to drop off with distance. In this way an order of magnitude savings in I/O bandwidth can be achieved into the display chip, as compared with using the display chip as a uniform-density display. A further advantage of varying the spatial resolution within the detail-level image is that such variation allows the creation of a smooth and continuous transition in effective resolution between the detail-level image and the surrounding wide-area image, which is less visually disruptive to the observer than is an abrupt transition in effective resolution.

There are many ways that this spatial variation can be effected, as described in prior art. For example, if the chip contains $n^2$ active pixels, intended to cover a 4 degree linear angle in the user's field of view, then the chip can be used at full resolution in the $(n/4)^2$ pixel (ie: one linear degree) foveal region, at half linear resolution in the two linear degree region surrounding that, and at quarter linear resolution in the rest of the chip.

If the pixels in the areas of half and quarter resolution are averaged into 2×2 and 4×4 squares of constant value, respectively, then the total number of unique pixel values is $(n/4)^2+(\frac{3}{4})(n/4)^2+(\frac{3}{4})(n/4)^2=(\frac{7}{64})(n×n)$.

Using as a Camera Rather than as a Projector

The arrangement of components described here and shown in FIG. 1 can be used as a foveated camera rather than as a foveated projector, by making the following modifications:

replace the detail-producing pixel-array imaging element (2) by a pixel-array image-capture element, such as a CCD and associated circuitry or CMOS chip.

- replace the wide-angle-image-producing pixel-array imaging element (6) with a pixel-array image-capture element, such as a CCD and associated circuitry or CMOS chip.
- use the lens (8) to gather light from a scene, and to focus that light both onto the plane of the masking TFT LCD (4), by transmitting light through the half-silvered mirror (7), and also onto the plane of the pixel-array imaging element (6) by reflecting light into the half-silvered mirror (7).
- use the condensing lens (5) to concentrate light that travels from the lens (8) through the masking TFT LCD (4), into the array of focusing elements (3), and finally onto the pixel-array image-capture element (2).

In this use as a foveated image-input device, the images formed by all of the focusing elements in the array of focusing elements (3) are optically superimposed onto the same region of the pixel-array image-capture element (2). As described above for when using the invention as a foveated image-output device, light from all regions of this array except the detail area of interest is blocked by the masking TFT LCD (4), by an selectively transparent spot pattern, as shown in FIG. 6.

Also, in this use as a foveated image-input device, the mathematical relationships between the optical components are identical to those relationships as earlier described for case where the invention is used as a foveated image-output device.

Retroreflective Gaze Tracking

When the invention is used as a camera, the small moving spot can be retroreflective; in this configuration an infrared light emitting diode or similar light emitter is optically superimposed on the center of the lens. A standard wide-view captured image is used to find the location of the eye of a user, and the small moving spot captured-image is guided by this information to track a small moving area that contains the image of the user's eye. The full resolution of a digital camera is always thereby available to measure the position of a retroreflection from the user's eye, thereby greatly increasing the accuracy of non-distracting user gaze tracking. This allows the foveated camera to be used for accurate user gaze tracking from a distance.

Multiple Sequential Stages

The mechanism can consist of multiple sequential stages. The image produced at each stage provide the input for the next stage. Each stage having an array of J×K lenses multiplies the number of images by a factor of J×K. For example, there can be two stages, each containing an array of 4×4 lenses, to create a total of 256 tiles, arranged in a 16×16 array.

Head-mounted Display

A projection image as described in this invention can be placed in a head-mounted display in place of a traditional LCD, going through the same optics, to make the image appear to be very wide angle focused at a distance far enough away to be comfortably viewable (e.g.: 100 linear degrees wide at 5 feet distance).

Remote Camera and Projector Application

The present invention, because it can match human eye saccades with zero latency, enables the combination of a remote camera and projection viewing apparatus. In this arrangement, the observer is situated at location A, and a foveated camera is situated at location B, which may be at a remote location (e.g.: in a different city). At the observer's location A there is an eye gaze tracker and a foveated projection system or head-mounted display.

The observer's gaze is tracked, and this information is transmitted electronically to remote location B. The gaze tracking information is used at location B to steer the foveal region of the remote camera. Both the detail-view image and the wide-area image capture by the camera are then transmitted from location B to location A. As described above in the section entitled "Spatially variable resolution on the imaging chip", each of these two images may be compressed before transmission by varying its spatial resolution around the foveal location. Other standard compression protocols, such as MPEG 2, may also be applied prior to transmission.

The respective detail-view and wide-area transmitted images are then displayed on the foveated projection system or head-mounted display at location A, and observed by the observer. The subjective impression for the observer is of a single extremely high resolution view of the scene visible at remote location B.

In addition, synthetic imagery may be inserted in both the detail-view and the wide-area view anywhere in the transmission process from the stage when images have been extracted from the foveated camera at location B to the stage when these images are about to be inserted into the foveated projection system or head-mounted display. This can be done using any standard computer graphic synthesis technique, such as those described in the proceedings of (Computer Graphics).

Patents Referenced (all of which are incorporated by reference herein)

U.S. Pat. No. 4,348,186: Pilot helmet mounted CIG display with eye coupled area of interest U.S. Pat. No. 4,634,384: Head and/or eye tracked optically blended display system U.S. Pat. No. 5,071,209: Variable acuity non-linear projection system U.S. Pat. No. 5,430,505: High speed eye tracking device and method U.S. Pat. No. 5,657,402: Creating a high resolution still image using a plurality of images U.S. Pat. No. 5,689,302: Higher definition video signals from lower definition sources U.S. Pat. No. 5,808,589: Optical system for a head mounted display combining high and low resolution images References (all of which are incorporated by reference herein)

(Bederson) B. Bederson, R. Wallace, E. Schwartz, "A miniature pan-tilt actuator: the spherical pointing motor," IEEE Transactions Robotics and Automation, vol. 10, pp. 298–308, 1994.

(Baluja) S. Baluja, D. Pomerleau, "Non-intrusive gaze-tracking using artificial neural networks." Neural information processing systems 6, Morgan Kaufman Publishers, New York, 1994.

(Chang) E. Chang, C. Yap, "A wavelet approach to foveating images" ACM Symposium on Computational Geometry, Vol 13, 1997.

(Computer Graphics) Computer Graphics (proceedings of ACM SIGGRAPH Conference), Vols 1–31;

(Curcio) C., Curcio, K. Sloan, O. Packer, A. Hendrickson, R. Kalina, (1987) "Distribution of cones in human and monkey retina: individual variability and radial asymmetry." Science 236, 579–582.

(Hansen) J. Hansen, A Andersen, P. Roed, "Eye-gaze control of multimedia systems." In Y. Anzai, K. Ogawa and H. Mori (eds), Symbiosis of human and artifact. Proceedings of the 6th international conference on human computer interaction. Elsevier Science Publisher, Amsterdam, 1995.

(Jacob) R. Jacob, "Eye tracking in advanced interface design." In W. Barfield and T. Furness (eds.), Advanced interface design and virtual environments. Oxford University Press, Oxford, 1995.

(Kortum) P. Kortum, W. Geisler, "Implementation of a foveated image-coding system for bandwidth reduction of video images," SPIE Proceedings: Human Vision and Electronic Imaging, vol. 2657, pp. 350–360, 1996.

(Pardo) F. Pardo, J. A. Boluda, J. J Perez, B. Dierickx, D. Scheffer, "Design issues on CMOS space-variant image sensors," Proc. SPIE, Advanced Focal Plane Processing and Electronic Cameras, Vol. 2950, pp. 98–107, 1996.

(Stiefelhagen) R. Stiefelhagen, J. Yang, A. Waibel, "Tracking Eyes and Monitoring Eye Gaze," Workshop on Perceptual User Interfaces, Banff, Canada, 1997

(van der Spiegel) J. van der Spiegel, G. Kreider, C. Claeys, I. Debusschere, G. Sandini, P. Dario, F. Fantini, P. Belluti, G. Soncini, "A foveated retina-like sensor using CCD technology,". In C. Mead & M. Ismail, editor, Analog VLSI implementation of neural systems, chapter 8, pp. 189–212. Kluwer Academic Publishers, Boston, 1989. Proceedings of a workshop on Analog Integrated Neural Systems.

(Velichovsky) B. Velichkovsky, "Communicating attention: Gaze position transfer in cooperative problem solving." Pragmatics and Cognition, 3(2), 199–222, 1995.

(Wodnicki) R. Wodnicki, G. W. Roberts & M. D. Levine, "A foveated image sensor in standard CMOS technology," Proc. Custom Integrated Circuits Conf., pp. 357–360, 1995.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A foveated display comprising:

a computer;

a detailed imaging element for imaging a detailed portion of an image from the computer, the imaging element connected to the computer;

a focusing mechanism for focusing the detailed portion of the image, the focusing mechanism disposed adjacent to the imaging element and connected to the computer;

a wide area imaging element for imaging a wide-area portion of the image, the wide area imaging element connected to the computer;

means to optically combine the detailed portion with the wide area portion to form a foveated image; and an imaging lens which focuses the foveated image to a desired location wherein the detailed imaging element, the focusing mechanism and the wide area imaging element have no moving parts.

2. A display as described in claim 1 wherein the focusing mechanism includes an active mask connected to the computer.

3. A display as described in claim 2 wherein the focusing mechanism includes focusing elements disposed between the detailed imaging element and the active mask for focusing the detailed portion of the active mask.

4. A display as described in claim 3 wherein the focusing mechanism includes a condensing lens for redirecting the detailed portion from the active mask to the combining means.

5. A display as described in claim 4 wherein the combining means includes a beam splitter disposed between the active mask and the wide area imaging element.

6. A display as described in claim 5 wherein the beam splitter is disposed at an intermediate angle between the active mask and the wide area imaging element.

7. A display as described in claim 6 wherein the focusing elements include an m×n array of focusing elements.

8. A display as described in claim 7 wherein the detailed portion follows an optical axis and a distance A along the optical axis between the detailed imaging element and the array of forming elements is n/k times a distance B between the array of focusing elements and the active mask, where k is a positive integer.

9. A display as described in claim 8 wherein K=2.

10. A display as described in claim 9 wherein each focusing element has a focal length f such that $1/f=1/A+1/B$.

11. A display as described in claim 10 including a pointing device which identifies where the detailed portion is disposed in the wide area portion.

12. A display as described in claim 5 wherein the beam splitter is disposed at a 45 degree angle between the active mask and the wide area imaging element.

13. A display as described in claim 5 wherein the beam splitter is a half-silvered mirror.

14. A method for producing a foveated image comprising the steps of:

producing a detailed portion of the image with a detailed imaging element from a computer connected to the detailed imaging element;

producing a wide area portion of the image with a wide area imaging element from the computer connected to the wide area imaging element;

combining the detailed portion with the wide area portion to form the foveated image; and focusing the foveated image onto a desired location.

15. A method as described in claim 14 wherein the combining step includes the step of focusing the detailed image and the wide area image onto a beam splitter.

16. A method as described in claim 15 wherein the producing the wide area image step includes the steps of retrieving the wide area image from the computer, and multiplying it by a dark spot image computed by the computer.

17. A method as described in claim 16 wherein before the multiplying step, there is the step of calculating the dark spot to be centered on a foveated region of the foveated display.

18. A method as described in claim 17 wherein the calculating step includes the step of calculating the dark spot to have a size which makes a gradual spatial transition between the detailed portion and the wide area portion.

19. A method as described in claim 18 wherein the producing the detailed portion step includes the step of obtaining the detailed portion from the computer that consists of a rectangular array of active pixels in a torodial topology.

20. A method as described in claim 19 wherein before the combining step there is the step of projecting the detailed image through an active mask which blocks the transmission of light everywhere except at a selectively transparent spot surrounding the foveated region.

21. A method as described in claim 19 wherein the projecting step includes the step of positioning the transparent spot so as to be optically coincident with the dark spot image.

* * * * *